Aug. 18, 1953 J. R. CORNETT 2,648,979
TRANSDUCER TESTING APPARATUS
Filed Aug. 9, 1946 2 Sheets-Sheet 1

Inventor
Jesse R. Cornett
By Mueller and Mason
Attorneys

Aug. 18, 1953

J. R. CORNETT 2,648,979

TRANSDUCER TESTING APPARATUS

Filed Aug. 9, 1946

Inventor
Jesse R. Cornett

By *Mueller and Mason*

Attorneys

Patented Aug. 18, 1953

2,648,979

UNITED STATES PATENT OFFICE 2,648,979

TRANSDUCER TESTING APPARATUS

Jesse R. Cornett, Tulsa, Okla., assignor to Seismograph Service Corporation, Tulsa, Okla., a corporation of Delaware Application August 9, 1946, Serial No. 689,474

27 Claims. (Cl. 73—67)

The present invention relates to electrical testing apparatus and more particularly to improved apparatus for determining one or more of the physical parameters of an electrical translator.

From the standpoint of manufacturing electrical translating devices, such, for example, as seismic detectors or geophones, galvanometers, meters, loudspeakers, telephone transmitters and receivers and the like, having known and uniform operating characteristics, it is necessary to measure or determine certain of the physical parameters of each manufactured unit either during manufacture of the unit or after manufacture of the unit is completed. Thus for several types of signal translation work, of which that of seismic signal detection is exemplary, transducers are required in which the physical parameters of air gap flux density, natural resonant frequency of the vibratory system and the damping factor of the vibratory system, are all critical. Moreover, if the parameters of natural resonant frequency, damping factor and dynamic coupling constant are known or measured, the overall operating characteristics of the translating device may be determined. Hence at some stage in the manufacture of such a unit or after manufacture is completed, the identified parameters should be measured with precision accuracy in order to determine whether or not the completed unit will meet the operative requirements of the particular application for which it is designed. Moreover, any such device of a given production type should have uniform operating characteristics, which means that the physical parameters thereof and particularly those mentioned above should each have magnitudes falling within predetermined limits. Known prior art methods and apparatus for determining these parameters are crude in the extreme. Generally speaking, all such prior art methods and apparatus for practicing the same require the use of laborious laboratory testing techniques and hence are prohibitive in cost if accurate results are to be even approached. Further, they require individual part-by-part testing at various stages in the manufacturing process, thus further increasing the cost. More important, and due to the fact that the results are obtained somewhat empirically as a consequence of the part-by-part testing, factors such as manufacturing discrepancies, the influence that one parameter may have on another, etc., are not taken into account in arriving at the actual magnitudes of the different parameters. The parameter of airgap flux density is particularly difficult to determine with conventional methods after an electrical translating device is fully assembled. The usual practice in determining the factor of airgap flux density involves inserting a pick up coil in the air gap of the device under test. Obviously, this is difficult to do once the pick up or operating winding of the device itself is positioned in the air gap and the device is otherwise fully assembled. Moreover, there is no known method of determining the true (undamped) natural resonant frequency of the vibratory system or a translating device after the device is fully assembled complete with damping facilities. On this point, it is known that when damping is imposed upon a vibratory system, the natural frequency of the system as distinguished from the natural resonant frequency (undamped condition) varies with changes in the degree of damping of the system (see Geophysical Exploration, pages 584, 589—published by Prentice Hall and authored by Heiland). Hence, when conventional methods are used in attempts to determine this frequency with damping present, erroneous results are obtained. For this reason, the more usual practice if accurate results are desired is that of measuring the natural resonant frequency of the vibratory system in an electrical translating device after the device is partially assembled and before the field structure is magnetized or damping is imposed upon the system.

For the above reasons, parameters having critical values are not usually obtained with even proximate accuracy in the finished product when conventional methods and apparatus are used to determine the same even though such methods are practiced with great care.

It is an object of the present invention, therefore, to provide improved apparatus for determining one or more of the physical parameters of an electrical translating device, such, for example, as a sound transducer, galvanometer or meter.

It is another object of the invention to provide apparatus for quantitatively determining any one of a plurality of physical parameters of an electrical translating device after the device is fully assembled and ready for its intended use.

It is still another object of the invention to determine the true (undamped) natural resonant frequency of the vibratory system in an electrical translating device after the device is fully assembled complete with damping facilities and the magnetic field structure thereof is magnetized.

According to a further object of the invention, improved apparatus for practicing the same is provided for successively determining whether or not the respective magnitudes of a plurality of physical parameters of an electrical translating device fall within acceptable limits.

In accordance with a further object of the invention, quantitative measurement of the magnitude of each particular physical parameter is, through use of the present improved apparatus, accomplished in a manner such that the result obtained is precisely accurate regardless of the magnitudes of other physical parameters of the device.

According to still another object of the invention, quantitative determination of the particular physical parameters of interest is accomplished wholly on an electrical basis, such that the only set-up operation required is that of connecting the pick-up or operating winding of the translating device under test to the test apparatus.

In accordance with a still further object of the invention, exceedingly simple and reliable apparatus of low cost is provided for performing the desired testing operations with but a few simple steps which may be carried out under the control of non-skilled testing personnel.

The invention, both as to its organization and method of operation, together with further objects and advantages thereof, will best be understood by reference to the following specification taken in connection with the accompanying drawings, in which:

Fig. 1 schematically illustrates testing apparatus characterized by the features of the present invention which may be employed to practice the improved method herein disclosed;

Figure 1:
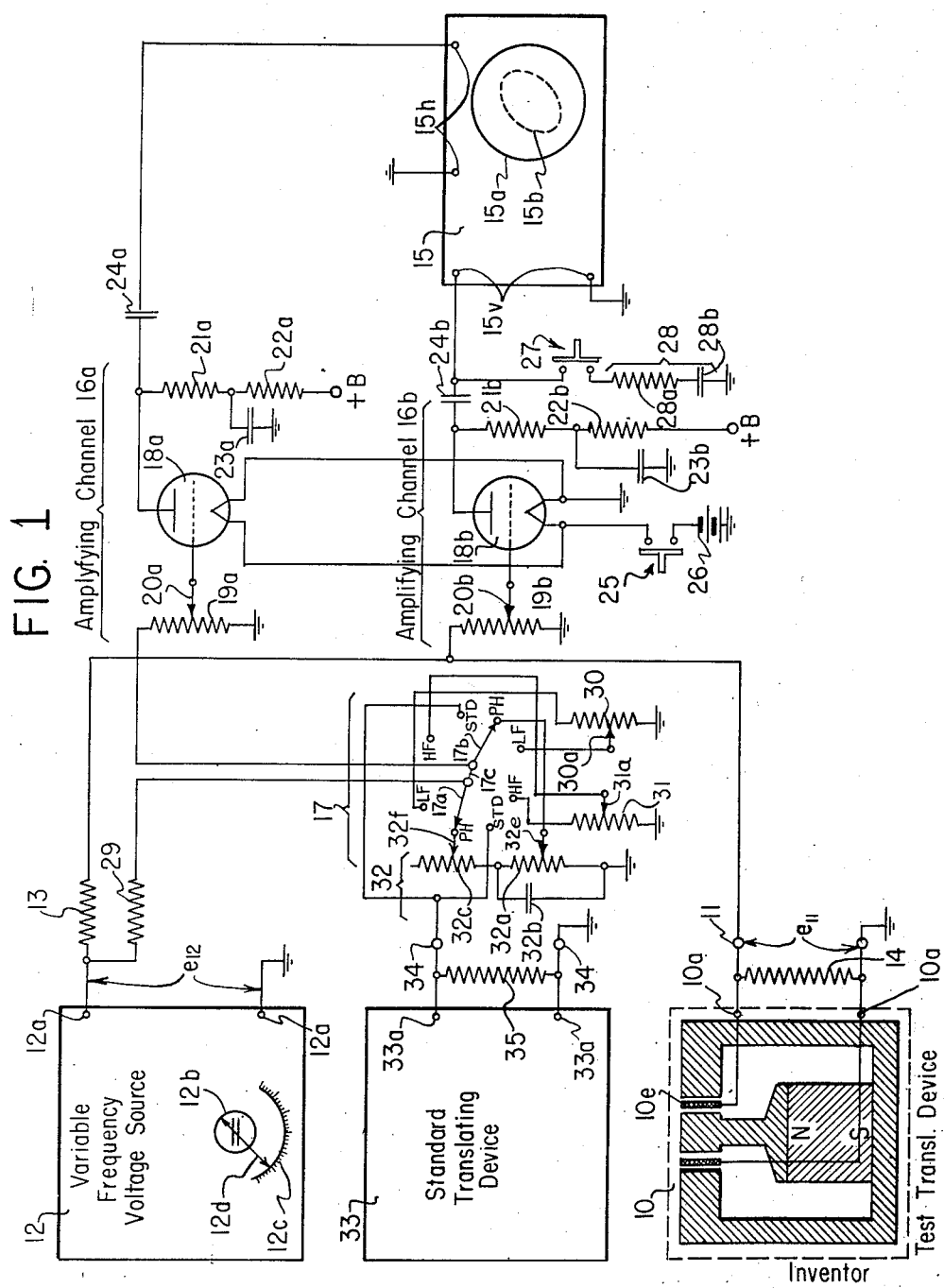
Figure 2:
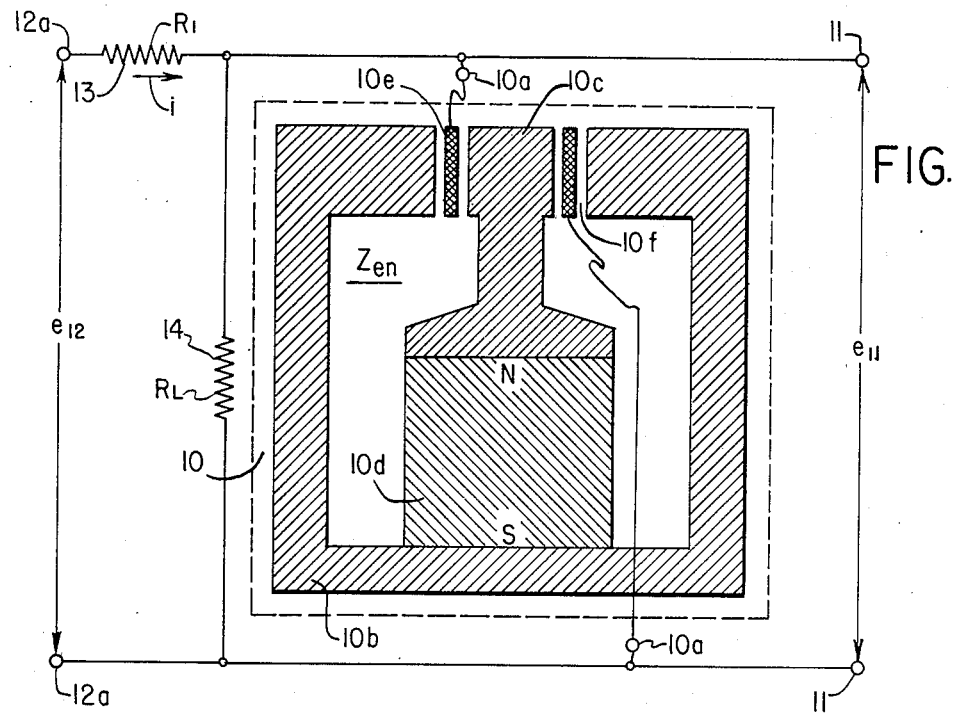
Fig. 2 illustrates in simplified form certain components of the apparatus shown in Fig. 1.

Referring now to the drawings and more particularly to Figs. 1 and 2 thereof, the present improved testing apparatus is there illustrated in its use to determine on accurate quantitative basis the physical parameters of an electrical translator or translating device 10 having a pick-up or operating winding 10e connected to the terminals 10a of the device for strap connection to the terminals 11 of the testing apparatus. Although as indicated above, the translating device 10 may be any type of electrical transducer (such for example, as a loudspeaker, telephone receiver, or telephone transmitter), a galvanometer, a current or voltage meter, or the like, it has been illustrated in Fig. 2 of the drawings as a seismic detector or geophone of conventional commercial construction. More specifically, the illustrated geophone 10 is of the permanent magnet dynamic type. In brief, it comprises a field structure 10b of the usual cup-shaped configuration within which is disposed a permanent polarizing magnet 10d which carries a pole piece 10c, the pole face of which is separated from the pole face of the field structure 10b by means of an annular air gap 10f. Within this air gap is disposed the pick-up winding 10e which constitutes the inertia element of the device and is spring suspended from the housing structure, not shown, of the device. Since the winding 10e acts as the inertia element and is of small mass, mechanical damping is not required to limit the amplitude of vibration thereof. On the contrary, electrical damping is usually relied upon, such damping being obtained by bridging the winding output terminals 10a with a damping resistor 14.

As indicated in the introductory portion of the specification, the purpose of the present improved testing apparatus, when used to practice the improved method herein disclosed, is that of quantitatively determining a plurality of the physical parameters of a geophone or other electrical translator 10 after the translator is fully assembled and ready for use. Specifically, the physical parameters of (1) natural resonant frequency of the vibratory system embodied in the translator 10, (2) flux density in the air gap 10f and (3) the degree of damping as measured in terms of the damping factor of the vibratory system embodied in the device may be accurately measured through use of the illustrated apparatus to practice the present improved method. In brief, this is accomplished by exciting the pick-up or operating winding 10e of the translator 10 from a variable frequency voltage source 12 through a decoupling resistor 13; amplifying the voltage of the source and the voltage developed across the winding 10e of the translator 10 under test through a pair of balanced amplifying channels 16a and 16b, respectively; and utilizing phase comparing means in the form of an oscilloscope 15 of conventional commercial construction to sense and hence, indicate the phase relationship between the two amplified voltages. The decoupling resistor 13 is characterized by a very high resistance value such that it is of relatively high impedance as compared with the combined impedance of the translator winding and the damping resistor 14 (of the order of twenty times the combined impedance of the translator winding 10e and the damping resistor 14) as measured at the terminals 11 at all frequencies within the operating frequency range of the voltage source 12. By thus decoupling the translator winding 10e from the voltage source, provision is made for production of a phase relationship between the voltage $E_{12}$ of the source and the voltage $E_{11}$ developed across the translator winding which varies as a function of the frequency of the voltage source. This voltage source may be of any desired commercial type having the requisite operating frequency range for testing the particular type of electrical translator of interest. In the specific application herein mentioned, i. e., that of testing seismic detectors or geophones, a voltage source 12 is used having an operating frequency range extending from 10 to 250 cycles per second, which is slightly greater than the operating frequency range of a geophone of standard construction. It is preferably in the form of a condenser tuned electronic sine wave oscillator, being provided with a tuning condenser 12b, the shaft of which carries an indicating element 12d cooperable with a calibrated frequency scale 12c to indicate the output frequency which the oscillator is tuned to deliver.

The amplifying channels 16a and 16b are identical in circuit arrangement and are designed to have identical amplitude frequency and phase-frequency response characteristics. Due to the identity of the circuit components respectively embodied therein, like components have been identified by the same reference numerals distinguished by the subscripts $a$ and $b$ respectively. Briefly, the amplifying channel 16a, employed to amplify a portion of the output voltage of the source 12 and to deliver the same to the horizontal electrode terminals 15h of the oscilloscope 15 through the coupling condenser 24a, comprises a thermionic tube 18a of the well known triode type having its input electrodes, i. e., its control grid and cathode, connected across an adjustable portion of an input potentiometer resistor 19a through a wiper 20a which is adjustable along the identified potentiometer resistor. Operating potential is supplied to the anode of the tube 18a from an appropriate direct current source, not shown, through an isolating resistor 22a and a load resistor 21a. These resistors are connected in series between the anode of the tube 18a and the +B terminal of the anode current source and have their juncture by-passed to ground through a condenser 23a.

Due to the similarity between the circuit arrangements of the two amplifying channels 16a and 16b, it is believed that the functional significance of the circuit components embodied in the amplifying channel 16b will be readily apparent from the above-detailed description of the amplifying channel 16a. It is noted, however, that the voltage developed at the output side of the amplifying channel 16b is impressed upon the vertical deflecting electrode terminals 15v of the oscilloscope 15 through a coupling condenser 24b, and further that the terminals of the input potentiometer resistor 19b are bridged directly across the winding 10e of the translator under test so that a variable portion of the voltage across this winding is impressed between the input electrodes of the tube 18b. In order to prevent the resistors 19a and 19b from appreciably loading the source 12 and the winding 10e of the device under test, these resistors are chosen to have resistance values approximately one hundred times greater than the resistance value of the decoupling resistor 13. Preferably the two tubes 18a and 18b are combined in a single envelope; that is, a tube of the well known twin triode type is preferably used. Cathode heating current for the tubes or tube sections is supplied from a direct current source 26 of appropriate voltage through the contacts of an on-off switch 25.

As pointed out more fully below, in certain production testing operations made to determine the natural resonant frequencies of the vibratory systems embodied in the devices under test, it is desirable quickly to determine whether an indicated departure from a standard natural resonant frequency value is above or below the standard value. To this end, a phase shifting or delay network 28 comprising a resistor 28a connected in series with a condenser 28b is adapted to be bridged across the vertical deflecting electrode terminals 15v of the oscilloscope 15 through the contacts of a push button switch 27.

The voltage of the variable frequency source 12 is adapted to be impressed across the terminals of the potentiometer resistor 19a through a decoupling resistor 29 of identical resistance value with the decoupling resistor 13 and having the function of generally equalizing the voltages impressed across the terminals of the two potentiometer resistors 19a and 19b and of further decoupling the amplifying channel 16a from the translator 10 under test. In this regard, it is noted that the potentiometer resistors 19a and 19b and the wipers 20a and 20b respectively adjustable therealong are for the purpose of equalizing the voltages appearing at the output sides of the channels 16a and 16b when equalized input voltages are applied across the terminals of the two identified resistors. In order to equalize the input voltages to the amplifying channels 16a and 16b and more particularly to equalize the voltages impressed across the two resistors 19a and 19b at two different frequency settings of the voltage source 12, independently adjustable means are provided in the form of potentiometer resistors 30 and 31 having wipers 30a and 31a respectively adjustable therealong. The resistors 30 and 31, together with a phase shifting network 32 having the function of artificially changing the phase relationship between the voltages impressed upon the amplifying channels 16a and 16b at the input sides thereof, are arranged selectively to be connected in circuit with the amplifying channel 16a at the input side thereof through operation of switching means in the form of a rotary switch 17. This switch, which may be of any standard commercial construction, is of the four position type and is comprised of two sets of contacts of four contacts each with which wipers 17a and 17b are respectively engageable. These wipers are electrically insulated from each other but are mechanically mounted for rotation with the same manually operable shaft diagrammatically represented at 17c. The phase shifting network 32 is comprised of two serially arranged potentiometer resistors 32a and 32c having wipers 32e and 32f respectively adjustable therealong. It further comprises a delay condenser 32b connected in shunt with the resistor 32a across the terminals thereof.

In order to effect an over-all duplication check of a translating device under test against a standardized device of the same type in the manner fully described below, thereby to compare the phase relationship between the voltage developed across the pick-up or operating winding of the test device with that developed across the pick-up or operating winding of the standard device, the switch 17 may also be used to connect a standard device 33 in circuit with the amplifying channel 16a at the input side thereof. To this end, the test apparatus is provided with a pair of input terminals 34 to which the winding terminals 33a of a standard translating device may be connected.

Figure 3:
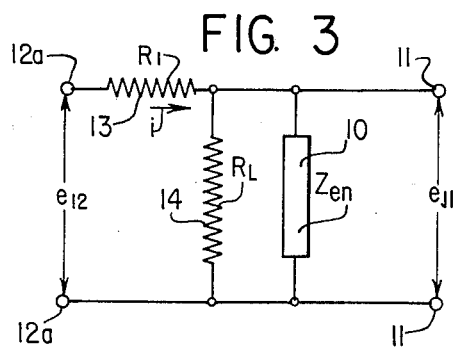
Figs. 3 and 4 are equivalent circuits of the circuit shown in Fig. 2, illustrated to facilitate an explanation of the invention.
Figure 4:
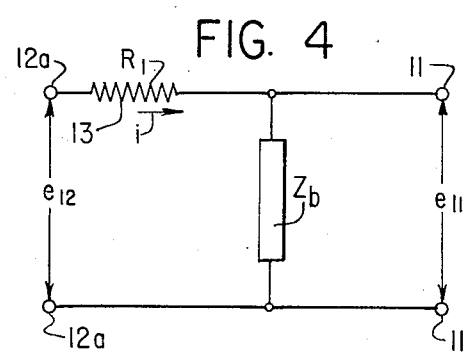

In general, the mode of operation of the above-described testing apparatus quantitatively to determine the three physical parameters of interest in a translating device 10 under test may best be understood by briefly analyzing on a theoretical basis certain portions of the circuit shown in Fig. 1 of the drawings and reproduced in equivalent form for clarity of analysis in Figs. 2, 3 and 4 of the drawings. In these equivalent circuits, the resistors 13 and 14 are represented as having resistances $R_1$ and $R_L$, the equivalent electrical impedance of the translating device 10 is represented as $Z_{en}$ and the current traversing the decoupling resistor 13 and flowing through the resistor 14 and the winding 10e in parallel is represented as $i$. Further the voltage across the terminals 12a of the source 12 is represented as $e_{12}$ and the voltage developed across the terminals of the winding 10e is represented as $e_{11}$.

An analysis of the circuits involves use of the following definitions:

$p = \dfrac{d}{dt}$ = complex operator (for steady state $p = j\omega$).

$j = \sqrt{-1}$.

$\omega = 2\pi f$ = angular velocity of vibratory system in radians per second.

$\pi = 3.1416$.

$f$ = frequency in cycles per second $L$ = inductance of blocked winding 10e in henrys.

$B$ = flux density in airgap 10f in gausses.

$l$ = length of conductor of winding 10e in the magnetic field in centimeters.

$K_g = Bl$ = dynamic coupling constant in gauss per centimeter.

$m$ = mass of coil 10e in grams.

$s$ = spring constant of suspension spring for winding 10e in dynes per centimeter.

$\omega_0 = 2\pi f_0 = \sqrt{s/m}$ = undamped natural angular velocity of vibratory system in radians per second.

$f_0$ = undamped natural frequency of vibratory system in cycles per second.

$R_0$ = internal real resistance of winding 10e in ohms.

$R_L$ = external damping resistance 14 in ohms.

$R_T = R_0 + R_L$.

$r_0$ = mechanical damping resistance in mechanical ohms.
$Z_e = R_0 + Lp$ = blocked impedance of the winding $10e$ in ohms.
(For steady state conditions $Z_e = R_0 + j\omega L$).
$Z_m = mp + s/p$.
$= \frac{m}{p}(p^2 + \omega_0^2)$ = mechanical rectilineal impedance of the vibratory system in mechanical ohms when no mechanical damping is present.
$\left[ \text{For steady state conditions } Z_m = \frac{m}{j}(\omega_0^2 - \omega^2) \right]$.
$Z_{em} = \frac{K_g^2 \times 10^{-9}}{Z_m}$ = motional electrical impedance of the vibratory system in ohms.
$Z_{en}$ = equivalent electrical impedance of the vibratory system in ohms.
$f(p)$ = applied force to mechanical system in dynes.
$X$ = relative displacement between coil $10e$ and magnetic system $10c$.
$\dot{X} = pV$ = velocity of coil $10e$ relative to magnetic system $10c$.

Preliminarily, it is pointed out that the general mathematical expression for the equivalent electrical impedance of a translating device of the character under consideration, as measured across the winding terminals of the device has been derived (see Dynamic Analogies, pages 124 to 126, inclusive; authored by H. F. Olsen and published by D. Van Nostrand Co., Inc., in 1943) as:

$$Z_{en} = Z_e + Z_{em} \quad (1)$$

$$= R_0 + Lp + \frac{K_g^2 \times 10^{-9}}{Z_m} \quad (2)$$

Substituting for $Z_m$:

$$Z_{en} = R_0 + Lp + \frac{K_g^2 \times 10^{-9}}{\frac{m}{p}(p^2 + \omega_0^2)} \quad (3)$$

For the steady state condition, it will be seen from the definitions:

$$Z_{en} = R_0 + j\omega L + \frac{K_g^2 \times 10^{-9}}{\frac{m}{j\omega}(\omega_0^2 - \omega^2)} \quad (3a)$$

From a comparison of the circuit shown in Fig. 3 of the drawings with its equivalent as represented in Fig. 4 of the drawings, it will be apparent that the parallel impedances $R_L$ and $Z_{en}$ combine to form the equivalent impedance $Z_b$ as follows:

$$Z_b = \frac{R_L Z_{en}}{R_L + Z_{en}} \quad (4)$$

Substituting from Equation $3a$ in Equation 4, the expression is obtained:

$$Z_b = \frac{R_L \left[ R_0 + j\omega L + \frac{K_g^2 \times 10^{-9}}{\frac{m}{j\omega}(\omega_0^2 - \omega^2)} \right]}{R_L + R_0 + j\omega L + \frac{K_g^2 \times 10^{-9}}{\frac{m}{j\omega}(\omega_0^2 - \omega^2)}} \quad (5)$$

Rationalizing Equation 5 and collecting terms, $$Z_b = \frac{R_L \left[ R_0(R_0+R_L) + \omega^2\left(L + \frac{K_g^2 \times 10^{-9}}{m(\omega_0^2-\omega^2)}\right)^2 + j\omega R_L\left(L + \frac{K_g^2 \times 10^{-9}}{m(\omega_0^2-\omega^2)}\right) \right]}{(R_0+R_L)^2 + \omega^2\left(L + \frac{K_g^2 \times 10^{-9}}{m(\omega_0^2-\omega^2)}\right)^2} \quad (6)$$

$$= \frac{R_L}{(R_0+R_L)^2 + \omega^2\left(L + \frac{K_g^2 \times 10^{-9}}{m(\omega_0^2-\omega^2)}\right)^2}\left[ R_0(R_0+R_L) + \omega^2\left(L + \frac{K_g^2 \times 19^{-9}}{m(\omega_0^2-\omega^2)}\right)^2 + j\omega R_L\left(L + \frac{K_g^2 \times 10^{-9}}{m(\omega_0^2-\omega^2)}\right) \right] \quad (7)$$

From Equation 7 it will be readily apparent that the phase angle $\theta$ of the equivalent impedance $Z_b$ is determined only by the factors within the large (square) brackets. Thus the resistance factor $$R_0(R_0+R_L) + \omega^2\left(L + \frac{K_g^2 \times 10^{-9}}{m(\omega_0^2-\omega^2)}\right)^2$$

is changed in the same ratio as the inductive reactance factor $$j\omega R_L\left(L + \frac{K_g^2 \times 10^{-9}}{m(\omega_0^2-\omega^2)}\right)$$

in response to changes in the common multiplying factor $$\frac{R_L}{(R_0+R_L)^2 + \omega^2\left(L + \frac{K_g^2 \times 10^{-9}}{m(\omega_0^2-\omega^2)}\right)^2}$$

Figure 5:
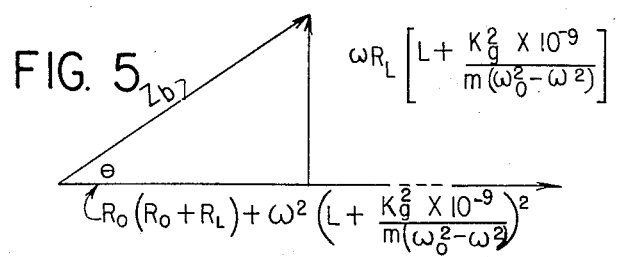
Fig. 5 is a vector diagram also illustrated to facilitate an explanation of the invention.

Hence, the vector diagram representing the equivalent circuit shown in Fig. 4 of the drawings may be as shown in Fig. 5 of the drawings. From this diagram or from Equation 7 it will be apparent that the phase angle $$\theta = \tan^{-1}\left[ \frac{\omega R_L\left(L + \frac{K_g^2 \times 10^{-9}}{m(\omega_0^2-\omega^2)}\right)}{R_0(R_0+R_L) + \omega^2\left(L + \frac{K_g^2 \times 10^{-9}}{m(\omega_0^2-\omega^2)}\right)^2} \right] \quad (8)$$

Moreover, since the decoupling resistor 13 has a resistance value $R_1$ which is relatively much greater than the impedance $Z_b$ (ratio of the order of 20 to 1), the voltage $e_{12}$ across the terminals of the source may properly be regarded (with negligible error) as the current-resistance voltage drop $iR_1$. Hence, the source 12 may properly be regarded as a constant current source. The voltage across the winding terminals 11, on the other hand, is the current-impedance voltage drop $iZ_b$. Hence, the phase angle $\theta$ of the equivalent impedance $Z_b$ is also the phase angle between the voltage across the terminals $12a$ of the source and the voltage across the winding terminals $10a$ of the translating device $10$ under test.

By definition, the undamped natural resonant frequency of the vibratory system embodied in the translating device $10$ is $f_0$, which when multiplied by $2\pi$, appears in Equation 8 as $\omega_0$. Similarly, the output frequency of the source $12$ when multiplied by $2\pi$ appears in Equation 8 as $\omega$. Now the source output frequency is indicated directly by the pointer $12d$ cooperating with the scale $12e$ of the voltage source oscillator. Further, the oscilloscope $15$ provides a direct indication of the phase relationship between the voltages $e_{12}$ and $e_{11}$ and hence of the phase angle $\theta$, the remaining factors in Equation 8 are all constants. Hence, by correlating the measured factors of phase angle $\theta$, and the frequency of the source $12$, the natural resonant frequency $f_0$ of the vibratory system embodied in the translating device $10$ under test may be determined.

More specifically, in Equation 8 the term $$\frac{K_g^2 \times 10^{-9}}{m(\omega_0^2 - \omega^2)}$$

approaches infinity as $\omega$ approaches $\omega_0$. Moreover, since this term is squared in the denominator, it will be seen that $\theta$ equals zero when $\omega$ equals $\omega_0$.

For frequencies of the applied voltage above the natural resonant frequency $f_0$, the Equation 8 may be expressed thus:

$$\theta = \tan^{-1}\left[\frac{\omega R_L\left(L - \frac{K_g^2 \times 10^{-9}}{m(\omega^2 - \omega_0^2)}\right)}{R_0(R_0+R_L) + \omega^2\left(L - \frac{K_g^2 \times 10^{-9}}{m(\omega^2-\omega_0^2)}\right)^2}\right] \quad (8a)$$

The numerator in this equation obviously becomes zero to reduce $\theta$ to zero when:

$$L - \frac{K_g^2 \times 10^{-9}}{m(\omega^2 - \omega_0^2)} = 0 \quad (8b)$$

Solving for $\omega$ in this equation:

$$\omega = \sqrt{\frac{K_g^2 \times 10^{-9}}{Lm} + \omega_0^2} \quad (9)$$

Thus it is found that the phase angle $\theta$ becomes zero at two frequencies of the applied voltage, i. e. when $\omega$ equals $\omega_0$ or $f$ equals $f_0$, and also when $$\omega = \sqrt{\frac{K_g^2 \times 10^{-9}}{Lm} + \omega_0^2}$$

or at the particular frequency $f_a$ of the source 12 when $$f_a = \frac{1}{2\pi}\sqrt{\frac{K_g^2 \times 10^{-9}}{Lm} + (2\pi f_0)^2} \quad (10)$$

The fact that zero phase displacement is present between the exciting voltage $e_{12}$ and the winding terminal voltage $e_{11}$ when the frequency $f$ of the exciting voltage exactly equals the natural resonant frequency $f_0$ of the vibratory system embodied in the translating device 10 under test permits use of an exceedingly simple and reliable method of measuring or quantitatively determining the natural resonant frequency of the vibratory system. Thus, all that is required is to excite the winding of the translating device from the source 12 through the decoupling path comprising the resistor 13 and adjust the frequency of the source 12 to the lowest frequency at which zero phase displacement between the voltages $e_{12}$ and $e_{11}$ is indicated by the oscilloscope 15. This source frequency is precisely equal to the natural resonant frequency of the vibratory system of the translating device 10 under test. Moreover, and by definition $$\left(2\pi f_0 = \sqrt{\frac{s}{m}}\right)$$

it is independent of the flux density in the airgap of the translating device and the degree of damping of the vibratory system of the device. From Equation 10, it is established that the phase displacement between the voltages $e_{12}$ and $e_{11}$ also becomes zero when the frequency of the source 12 is adjusted to a value $f_a$ higher than the value $f_0$. A convenient method is thus afforded for determining the dynamic coupling constant and hence the flux density in the airgap of the translating device under test. Thus by definition the airgap flux density B equals the dynamic coupling constant $K_g$ divided by the length $l$ of the conductor making up the pick-up or operating winding of the device. Moreover, the inductance L of the winding and the mass $m$ thereof may be determined by using well known and conventional methods. Further, the value of $\omega_0 = 2\pi f_0$ may be readily determined on a quantitative basis in the manner briefly outlined above and more fully explained below. Hence, by adjusting the frequency of the source to the value $f_a$, higher than $f_0$, at which zero phase displacement between the voltages $e_{12}$ and $e_{11}$ is indicated by the oscilloscope 15, and using the value of $f_a$ thus obtained and the value $\omega_0$ previously obtained, Equation 10 may be solved for the airgap flux density B. From Equation 10, it will be apparent that the value obtained for the airgap flux density factor B is independent of the degree of damping of the vibratory system embodied in the translating device under test, but is dependent upon the natural resonant frequency $f_0$ of the vibratory system of the device. However, since the frequency value $f_0$ may be accurately obtained first in a manner independent of the airgap flux density and the degree of damping, use of this factor in later determining the airgap flux density factor B does not in any way render inaccurate the value obtained for the airgap flux density factor B.

When electrical damping, i. e., a shunt resistor 14, is used to effect damping of the vibratory system of the translating device 10 under test, the general equation for the transducer system, similar to a geophone, when the coil is displaced an amount X by an external force $f(p)$ becomes:

$$Z_m \frac{dX}{dt} - K_g \times 10^{-1} i = f(p)$$

$$K_g \times 10^{-8} \frac{dX}{dt} + (Z_e + R_L)i = 0 \quad (11)$$

Solving Equation 11 for the current $i$ flowing in the network due to the coil motion relative to the magnetic field system:

$$i = \frac{\begin{vmatrix} Z_m & f(p) \\ K_g \times 10^{-8} & 0 \end{vmatrix}}{\begin{vmatrix} Z_m & -K_g \times 10^{-1} \\ K_g \times 10^{-8} & Z_e + R_L \end{vmatrix}} = \frac{f(p) K_g \times 10^{-8}}{Z_m(Z_e+R_L) + K_g^2 \times 10^{-9}} \quad (12)$$

Therefore:

$$E_L = iR_L = -\frac{K_g R_L f(p) \times 10^{-8}}{Z_m(Z_e + R_L) + K_g^2 \times 10^{-9}} \quad (13)$$

$$= -\frac{K_g R_L \times 10^{-8} f(p)}{\frac{m}{p}(p^2 + \omega_0^2)(R_0 + R_L + Lp) + K_g^2 \times 10^{-9}}$$

$$= -\frac{K_g R_L \times 10^{-8} p f(p)}{m\left[(p^2 + \omega_0^2)(R_0 + R_L + Lp) + p\frac{K_g^2 \times 10^{-9}}{m}\right]} \quad (14)$$

In order for Equation 14 to have an expression for simple damping it is necessary for $R_0 + R_L$ to be large compared to $Lp$. In a transducer such as a geophone this is a good approximation. Thus Equation 14 becomes:

$$E_L = \frac{K_g R_L \times 10^{-8}}{m(R_0 + R_L)}\left[\frac{p f(p)}{p^2 + \frac{K_g^2 \times 10^{-9}}{m(R_0\ R_L)}p + \omega_0^2}\right] \quad (15)$$

The term $Lp$ is of sufficient magnitude at frequencies which are high relative to the natural frequency $f_0$ that the term must be included in the expression. Now if the geophone coil is given a unit displacement and released, $(f(p)=1)$ the oscillatory motion to be observed as the voltage "$E_L$" developed across the resistor $R_L$ Equation 15 becomes:

$$E_L = -\frac{K_g R_L \times 10^{-8}}{m(R_0 + R_L)}\left[\frac{p}{p^2 + \frac{K_g^2 \times 10^{-9}}{m(R_0+R_L)}p + \omega_0^2}\right] \quad (16)$$

From J. R. Carson's book "Electric Circuit Theory" published by the McGraw-Hill Publishing Company in 1926 an expression is obtained for the operational solution of Equation 16 (see page 40, Equation K):

$$A(t) = \frac{p\lambda}{(p+\mu)^2 + \lambda^2} = \epsilon^{-\mu t} \sin \lambda t \quad (17)$$

It is noted that the term $A(t)$ has been used to keep from confusing the equivalent term "$h$" as used by Carson with the damping factor "$h$" of the present development.

To put Equation 16 in the form of Equation 17, both the numerator and denominator of Equation 16 are multiplied by $\lambda$. Thus for Equation 16 the expression is obtained:

$$E_L = -\frac{K_g R_L \times 10^{-8}}{m(R_0+R_L)\lambda} \left[ \frac{p\lambda}{p^2 + \frac{K_g^2 \times 10^{-9}}{m(R_0+R_L)}p + \omega_0^2} \right] \quad (18)$$

Comparing Equation 18 with Equation 17:

$$E_L = -\frac{K_g R_L \times 10^{-8}}{m(R_0+R_L)\lambda} \epsilon^{-\mu t} \sin \lambda t \quad (19)$$

where $$\mu = \frac{K_g^2 \times 10^{-9}}{2m(R_0+R_L)}$$

and $$\mu^2 + \lambda^2 = \omega_0^2 \quad (20)$$

From Heiland's book "Geophysical Exploration" at page 585, Equation 9-86C, it is shown that the damping factor can be expressed in terms of the ratio between the damping of the system and critical damping for the system. Now in Equation 19, $h = \mu/\omega$; when $h$=damping factor=the ratio of actual damping of the system to critical damping for the system. For a critically damped system $h=1$.

Thus in Equation 15:

$$2h\omega_0 = \frac{K_g \times 10^{-9}}{m(R_0+R_L)} \quad (21)$$

It is noted that when the assumption that $R_0+R_L$ is substantially greater than $Lp$ is not valid, the operational equation becomes a third order differential equation and the solution will contain a term $a\epsilon^{-at}$ in addition to the damped oscillatory motion. Thus the definition for damping as defined in this development does not hold (see an article by Daniel Silverman in "Geophysics" January 1939, volume 4, No. 1, p. 53, published by the Society of Exploration Geophysicists).

From Equation 21 it is evident that:

$$K_g^2 = 2h\omega_0 m(R_0+R_L) \times 10^9 \quad (22)$$

Substituting for $K_g^2$ in Equation 8, this equation reduces to $$\theta = \tan^{-1} \left[ \frac{\omega R_L \left( \frac{L}{R_0+R_L} + \frac{2h\omega_0}{\omega_0^2 - \omega^2} \right)}{R_0 + (R_0+R_L)\left( \frac{L}{R_0+R_L} + \frac{2h\omega_0}{\omega_0^2 - \omega^2} \right)^2} \right] \quad (23)$$

In this equation, the factors $L$, $R_0$ and $R_L$ are either known or may be determined by well known and conventional methods. The factor $\omega_0 = 2\pi f_0$ may be accurately determined in the manner explained above. The factors $\omega$ and $\theta$ are respectively determined by observing the frequency setting of the source 12 and the phase displacement between the voltages $e_{12}$ and $e_{11}$ as indicated by the oscilloscope 15. Hence, Equation 23 may be solved to determine the value of the damping factor $h$.

From the foregoing theoretical analysis of the circuits shown in Figs. 2, 3 and 4, it will be understood that the apparatus illustrated in Fig. 1 and described above may be operated in accordance with the present improved method to determine on a quantiative basis the following physical parameters of any electrical translating device:

1. The undamped natural resonant frequency $f_0$ of the vibratory system embodied in the device.
2. The airgap flux density B of the device.
3. The degree of damping as measured in terms of the magnitude of the damping factor $h$.

The importance of determining these factors in the order named is evident from the fact (see Equations 10 and 23 above) that before the flux density and damping factors can be determined, the natural resonant frequency $f_0$ must be determined and from the further fact that for a high order of accuracy the damping factor $h$ should be calculated at a voltage source frequency value intermediate the frequency values $f_0$ and $f_a$.

Briefly to consider the mode of operation of the apparatus shown in Fig. 1 of the drawings to practice the present improved method in determining the magnitudes of the described physical parameters of a particular translating device, it is pointed out that before using the apparatus certain preliminary adjustments should be made in the apparatus. Specifically, the vertical electrode terminals 15v of the oscilloscope 15 are disconnected from the amplifying channel 16b and connected to the horizontal electrode terminals 15h. The selector switch 17 is now operated to bring the wipers 17a and 17b thereof into engagement with the standard contacts STD of the switch. The test translating device 10 and the standard translating device 33 should be disconnected from the terminals 11 and 34, respectively, during premilinary checking of the apparatus. With the voltage source 12 in operation and the switch 17 in its STD position, the voltage appearing across the terminals 12a of this source is impressed across the potentiometer resistor 19a over a path which includes the decoupling resistor 29, the wiper 17a and its engaged STD contact and the wiper 17b and its engaged STD contact. This voltage, or more accurately the portion thereof appearing between the wiper 20a and ground, is amplified through the amplifying channel 16a in a conventional manner and impressed across the horizontal electrode terminals 15h and the vertical electrode terminals 15v of the oscilloscope 15 through the coupling condenser 24a. Thus, in phase voltages of identical amplitude are impressed across the horizontal and vertical electrode terminals of the oscilloscope 15. The gain control facilities, not shown of the oscilloscope are now adjusted to bring the beam pattern of the oscilloscope, which is a straight line (due to the fact that the phase-frequency characteristics of the amplifier channels of the oscilloscope are identical), to an angle of 45 degrees relative to the horizontal. Following this adjustment, the frequency of the source 12 should be varied throughout the frequency range thereof to check the oscilloscope for phase shift. In this regard, it will be understood that when phase displacement is produced between the voltages impressed upon the horizontal and vertical electrodes of the oscilloscope, the straight line pattern of the beam changes to an ellipse pattern and further that the degree of ellipsing is a measure of the phase relationship between the two voltages. Thus, if the oscilloscope 15 is out of calibration over the operating frequency range of the source 12, variation in the frequency of this source over its operating range will produce ellipsing of the oscilloscope beam pattern at the frequency or frequencies at which the oscilloscope is out of calibration.

Following the preliminary checking operation just described, the vertical electrode terminals 15v are disconnected from the horizontal electrode terminals 15h and reconnected to the output side of the amplifying channel 16b. With the equipment in this condition, voltage from the source 12 as amplified through the channel 16a is impressed between the horizontal electrode terminals of the oscilloscope 15 in the exact manner explained above. The vertical electrode terminals 15v have an in-phase excitation voltage impressed thereon from the output side of the amplifying channel 16b, the input potentiometer resistor 19b of this channel being bridged across the terminals 12a of the source 12 through the decoupling resistor 13. The next operation is that of equalizing the input voltages to the amplifying tubes 18a and 18b through suitable adjustment of the wipers 20a and 20b along the potentiometer resistors 19a and 19b, respectively. As indicated above, the amplifying channels 16a and 16b have identical frequency response, gain and time delay characteristics. Accordingly, when the wipers 20a and 20b are adjusted to equalize the input voltages to the amplifier channels 16a and 16b, output voltages of identical magnitude are impressed across the horizontal and vertical electrode terminals 15h and 15v, respectively, of the oscilloscope 15. Hence, when the straight line beam pattern produced on the oscilloscope screen is adjusted to an angle of 45 degrees relative to the horizontal through adjustment of the wipers 20a and 20b, equalized input voltages to the two tubes 18a and 18b are indicated.

After the described preliminary adjustments are completed, a translating device 10 to be tested may be connected to the testing apparatus by connecting the terminals 10a thereof to the terminals 11 of the testing apparatus. These winding terminals of the device will of course be bridged by a damping resistor 14 having a resistance value which is calculated to provide the desired degree of damping of the vibratory system embodied in the device 10 under test. After these connections are made and with the wipers 17a and 17b of the selector switch 17 adjusted to engage the low frequency contacts LF, the frequency of the source 12 is adjusted to the lowest value at which ellipsing of the beam pattern 15b produced by the oscilloscope 15 is eliminated, i. e., to a value at which a straight line beam pattern is formed by the oscilloscope. It will be noted that with the selector switch 17 standing in the LF position, the adjustable signal attenuation potentiometer resistor 30 is at least in part bridged across the terminals of the potentiometer resistor 19a. Accordingly, when the frequency of the source 12 is adjusted to produce a straight line beam pattern on the oscilloscope 15, it may have an angle greater or less than the desired 45 degree angle relative to the horizontal due to the fact that voltages of unequal magnitudes are being impressed across the terminals of the amplifying channel input resistors 19a and 19b. In order to equalize these voltages and thus equalize the output voltages of the two channels 16a and 16b, the wiper 30a is adjusted along the resistor 30 to increase or decrease the voltage impressed across the terminals of the resistor 19a. The direction of adjustment of the wiper 30a along the resistor 30 is of course in the correct sense to equalize the output voltages of the two amplifying channels 16a and 16b, thereby to restore the desired 45 degree angle between the beam pattern on the oscilloscope 15 and the horizontal. Minor readjustment of the output frequency of the source 12 may thereafter be required in order to re-establish the desired straight line pattern at which no phase displacement occurs between the voltage $e_{12}$ across the source terminals 12a and the voltage $e_{11}$ developed across the test terminals 11.

From the above theoretical analysis, it will be understood that when a straight line beam pattern is established in the manner just described, to in turn establish a condition of zero phase displacement between the voltages $e_{12}$ and $e_{11}$, the frequency of the source 12 exactly equals the natural resonant frequency $f_0$ of the vibratory system embodied in the translating device 10 under test. Assuming accurate calibration of the scale 12c, this frequency may be determined by observation of the position of the pointer 12d along the scale 12c. Thus the first of the physical parameters of interest is accurately determined on a quantitative basis.

In order next to determine the airgap flux density of the translating device 10 under test, the wipers 17a and 17b of the selector switch 17 are shifted to engage their respective associated high frequency contacts HF. With the switch 17 in this setting, the frequency of the voltage source 12 is increased until a straight line beam pattern indicative of zero phase displacement between the voltages $e_{12}$ and $e_{11}$ is re-established on the oscilloscope 15. In this position of the switch 17; the voltage attenuating potentiometer resistor 31 or at least a part thereof is bridged across the terminals of the amplifying channel input potentiometer resistor 19a through the wiper 17b. Accordingly, adjustment of the wiper 31a along the resistor 31 to equalize the voltages across the resistors 19a and 19b may be required to re-establish the 45 degree angular relationship between the oscilloscope beam pattern and the horizontal. Also, this adjustment may require slight readjustment of the output frequency of the source 12 in order to eliminate slight ellipsing of the beam pattern, which is brought about through equalization of the voltages impressed upon the input potentiometer resistors 19a and 19b of the two amplifying channels. The source frequency value as established in the manner just explained is the frequency value of $f_a$ as used in Equation 10 above. With this frequency value determined and $f_0$ known, Equation 10 may now be solved to determine the airgap flux density B of the translating device 10 under test in a manner which will be clearly apparent from the preceding theoretical analysis.

For the purpose of next determining the degree of damping of the vibratory system embodied in the translating device 10 under test, the output frequency of the voltage source 12 is adjusted to a value different from the frequency values $f_0$ and $f_a$ and preferably intermediate these values without shifting the selector switch 17 from its HF setting. This change in the output frequency of the source 12 effects ellipsing of the beam pattern on the oscilloscope 15 by an amount which is related to the magnitude of the damping factor $h$ from which the degree of damping is determined. More specifically, by measuring the amount of ellipsing transversely of the beam pattern 15b to determine the magnitude of phase shift between the voltages $e_{11}$ and $e_{12}$, observing the frequency of the source 12 at which this amount of ellipsing is produced and by having previously determined the magnitude of the natural resonant frequency $f_0$, Equation 23 above may be solved to calculate the magnitude of the damping factor $h$.

It will be apparent that by following the steps described above, the three principal physical parameters of interest in a standard translating device of a particular type may be readily and accurately determined. For example, it may be determined that the natural resonant frequency of the vibratory system embodied in a standard geophone or seismic detector of a particular type is 35 cycles per second. It may also be determined that the exact desired airgap flux density of the standard geophone is obtained when an in phase relationship (as indicated by the oscilloscope 15) is established between the voltages $e_{12}$ and $e_{11}$ at a frequency value $f_a$ of 84 cycles per second. These determined low and high frequency values may now be used in the production testing of geophones of the same type.

In order to eliminate calculation of the damping factor $h$ in the production testing of translating devices of a particular type, a standard device having the exact desired damping factor $h$ is connected to the terminals 11 and the frequency of the voltage source 12 is adjusted to an arbitrary value preferably of the order of 50 cycles per second. The wipers 17a and 17b of the selector switch 17 are now actuated to engage their respective associated PH contacts. In this position of the switch 17, the phase shifting network 32 is connected between the decoupling resistor 29 and the input potentiometer resistor 19a of the amplifying channel 16a to introduce a phase shift between the voltage $e_{12}$ and the voltage developed between the wiper 20a and ground. Without changing the arbitrarily selected frequency setting of the voltage source 12, the adjustable components of the network 32 are now adjusted to bring the voltage between the wiper 20a and ground in phase with the voltage $e_{11}$ and to equalize the magnitudes of these voltages. To this end, the wiper 32e is first adjusted along the resistor 32a to shift the phase of the voltage between the wiper 20a and ground until this voltage is in phase with the voltage $e_{11}$, i. e. until a straight line beam pattern is produced by the oscilloscope 15. The next step is that of adjusting the wiper 32f along the resistor 32c to equalize the voltage inputs to the amplifying channels 16a and 16b and thus re-establish the desired 45 degree angular relationship between the beam pattern 15b and the horizontal. With the constants of the network 32 thus established, it will be apparent that if a production translating device 10 to be tested is substituted for the standard translating device and that the damping factors $h$ of the two devices are equal, zero phase shift between the voltage $e_{11}$ and that developed between the wiper 20a and ground will be indicated by the oscilloscope 15 when the variable frequency source 12 is adjusted to have the arbitrarily selected frequency of 50 cycles per second. Thus, in using the described apparatus in the production testing of geophones of the particular type mentioned, zero phase displacement between the voltages impressed upon the amplifying channels 16a and 16b should be indicated by the oscilloscope 15 when the frequency of the source 12 is adjusted to values of 35, 84 and 50 cycles per second with the switch 17 standing respectively in its LF, HF and PH settings.

The network 32 may also be used as a phase shifting device to provide for determination of the damping factor $h$ directly. Thus with a desired damping factor $h$ known, the parameters of the network 32 may be calculated at a given frequency to determine the phase shift which the network must produce to equalize that attributable to the damping factor $h$ of a translator under test.

It will be understood from the above that in the production testing of geophones of the particular type referred to, a test geophone is first connected to the terminals 11a, following which the selector switch is operated to its LF setting. While the switch 17 is in this setting, the frequency of the source 12 is adjusted to a value of 35 cycles per second. If this frequency, $\pm 1$ cycle per second, produces an indicated zero phase relationship between the voltages $e_{11}$ and $e_{12}$ on the oscilloscope 15, the natural resonant frequency $f_0$ of the test geophone is determined to be satisfactory. On the other hand, if either of the frequency limits of 34 and 36 cycles per second must be exceeded in adjusting the frequency of the source 12 to establish zero phase relationship between the voltages $e_{12}$ and $e_{11}$, the test geophone is determined to be unsatisfactory.

In the latter case, it will be understood that since the natural resonant frequency $f_0$ of the vibratory system in the geophone 10 under test is different from the desired value of 35 cycles per second, an ellipse beam pattern 15b is produced by the oscilloscope 15 when the frequency of the source 12 is adjusted to this value. In order to determine whether the natural resonant frequency $f_0$ of the vibratory system in the test geophone 10 is above or below 35 cycles per second, a transient test may be performed by closing the switch 27 to bridge the phase shifting network 28 across the vertical electrode terminals 15v of the oscilloscope 15. Closing of this switch has the effect of shifting the phase relationship between the voltages respectively impressed across the electrode terminals 15h and 15v in a sense that if the ellipse beam pattern 15b tends to close, an indication is provided that the natural resonant frequency $f_0$ of the test geophone 10 is below 35 cycles per second, whereas if the ellipse pattern is broadened, an indication is provided that the natural resonant frequency $f_0$ is above 35 cycles per second. Thus a convenient method is provided for rapidly determining whether or not the natural resonant frequency $f_0$ of the vibratory system of the geophone 10 under test is above or below the particular desired value.

The next step in the production testing operation is that of shifting the selector switch 17 to its HF setting and adjusting the frequency of the source 12 to a frequency value of 84 cycles per second, $\pm 2$ cycles per second. If phase coincidence between the voltages $e_{11}$ and $e_{12}$ is indicated on the oscilloscope 15 with the frequency of the source 12 adjusted to a value within the described range, the airgap flux density of the test geophone may also be regarded as satisfactory. On the other hand, if adjustment of the frequency of the source 12 beyond the limits of 82 and 86 cycles per second is required to establish a straight line beam pattern 15b on the oscilloscope 15, increased or decreased magnetization of the polarizing magnet provided in the test geophone 10 is indicated as desirable.

The next step in the production testing operation is that of shifting the selector switch 17 to its PH setting and adjusting the frequency of the source 12 to a value of 50 cycles per second, ±5 cycles per second. If, within the indicated range of 45 to 55 cycles per second, phase coincidence between the voltages impressed upon the amplifying channels 16a and 16b is indicated by a straight line beam pattern 15b on the oscilloscope 15, the damping factor $h$ and hence the degree of damping of the vibratory system embodied in the test geophone translating device are determined to be satisfactory. On the other hand, if adjustment of the voltage source frequency to a value below 45 cycles per second or above 55 cycles per second is required to produce a straight line beam pattern on the oscilloscope 15, a change in the resistance value of the damping resistor 14 across the winding terminals 10a of the geophone 10 under test is indicated. Thus all three of the critical physical parameters of each test geophone may be rapidly and accurately checked to determine whether or not the magnitudes of these parameters are within acceptable limits. Moreover, the character of the indication which is produced if any one of the parameters of a given geophone is not within acceptable limits is such that the type of corrective action which should be taken is clearly indicated. Although the testing steps have been described with reference to degree of departure of the frequency of the source 12 from given frequency standards in determining whether or not the observed physical parameters of a device under test are within limits, it will be understood that observation of the degree of phase shift between the voltages $e_{11}$ and $e_{12}$ as indicated by the oscilloscope 15 at the three determined source frequencies $f_0$, $f_a$ and $f_{ph}$ may be employed with equally good results to determine whether or not the physical parameters are within the desired limits.

If it is desired to check the test geophone 10 against a standard throughout the operating frequency range thereof, a standardized geophone 33 may be connected to the terminals 34 and the selector switch 17 shifted to its standard setting STD. In this position of the switch 17, the resistance of the resistor 35 combines with the impedance of the standardized geophone 33 to form an equivalent impedance $Z_b$ which is identical with the impedance $Z_b$ of the test geophone 10 and its shunt damping resistor 14 if and only if the impedance characteristics of the two geophones 10 and 33 are identical.

Assuming identity of the impedance $Z_b$ between the terminals 34 and 11, respectively, identical phase shifts are produced between the voltage $e_{12}$ and the voltage developed between the wiper 20a and ground, on the one hand, and the voltage $e_{11}$ and the voltage between the wiper 20b and ground, on the other hand, at all frequencies within the operating frequency range of the voltage source 12. As a result, if the frequency of this source is varied throughout the operating frequency range of the source, a straight line beam pattern 15b is continuously produced on the screen of the oscilloscope 15. On the other hand, if the physical parameters of the test geophone 10 are different from those of the standardized geophone 33, such that the impedances $Z_b$ across the two sets of terminals 11 and 34 are different, phase displacement is produced between the voltages impressed upon the input sides of the two amplifying channels 16a and 16b at certain frequencies within the operating frequency range of the source 12. Such phase displacement will of course manifest itself by producing ellipsing of the beam pattern 15b on the oscilloscope 15. Moreover, the degree of ellipsing provides an indication as to the magnitude of the departure of the characteristics of the test geophone 10 from the characteristics of the standardized geophone 33. Hence, if inordinate ellipsing of the beam pattern 15b occurs during a test of the character under consideration, further testing of the test geophone 10 in the manner described above is indicated.

From the foregoing explanation it will be clearly apparent that the present improved apparatus affords an eminently satisfactory solution to the problem of accurately determining on a quantitative basis the physical parameters of electrical translators or translating devices after the devices are fully assembled and ready for use. It will also be apparent that the methods of determining these parameters and of determining whether or not the parameters are within certain limits are simple in the extreme and may easily be practiced in production testing by non-skilled personnel. Further, the apparatus used in practicing the present improved methods consists of a relatively small number of standard circuit components of relatively low cost which may be easily assembled, and lends itself to rapid and efficient handling in practicing the improved methods herein disclosed.

While one embodiment of the invention has been disclosed it will be understood that various modifications may be made therein which are within the true spirit and scope of the invention as defined in the appended claims.

I claim:

1. Apparatus for determining at least one of the physical parameters of an electrical transducer provided with a pick-up or operating winding, comprising an alternating current voltage source, circuit means including a decoupling impedance for impressing the voltage of said source across the terminals of the winding, and means coupled to said source and the winding for measuring the phase relationship between the voltage thereacross.

2. Apparatus for determining at least one of the physical parameters of an electrical transducer provided with a pick-up or operating winding, comprising a variable frequency voltage source, circuit means including a decoupling impedance for impressing the voltage of said source across the terminals of the winding, a phase sensing device provided with two sets of input terminals and operative to indicate the phase relationship between two voltages respectively impressed between said two sets of input terminals, balanced amplifying channels for respectively impressing the voltage across the winding and the voltage of said source upon said two sets of terminals, and adjustable means for equalizing the input voltages to said amplifying channels.

3. Apparatus for determining at least one of the physical parameters of an electrical transducer provided with a pick-up or operating winding, comprising a variable frequency voltage source, circuit means including a decoupling impedance for impressing the voltage of said source across the terminals of the winding, a phase comparing device provided with two sets of input terminals and operative to indicate the phase relationship between two voltages respectively impressed between said two sets of input terminals, balanced amplifying channels for respectively impressing the voltage across the winding and the voltage of said source upon said two sets of terminals, and independently adjustable means for equalizing the input voltages to said amplifying channels at two different frequency values of said variable frequency voltage source.

4. Apparatus for determining at least one of the physical parameters of an electrical transducer provided with a pick-up or operating winding, comprising a variable frequency voltage source, circuit means including a decoupling impedance for impressing the voltage of said source across the terminals of the winding, a phase sensing device provided with two sets of input terminals and operative to indicate the phase relationship between two voltages respectively impressed between said two sets of input terminals, balanced amplifying channels for respectively impressing the voltage across the winding and the voltage of said source upon said two sets of terminals, independently adjustable means for respectively equalizing the input voltages to said amplifiers at two different frequency values of said variable frequency source, and switching means for selectively connecting said independently adjustable means in circuit with one of said amplifiers at the input side thereof.

5. Apparatus for determining at least one of the physical parameters of an electrical transducer provided with a pick-up or operating winding, comprising a variable frequency voltage source, circuit means including a decoupling impedance for impressing the voltage of said source across the terminals of the winding, a phase sensing device provided with two sets of input terminals and operative to indicate the phase relationship between two voltages respectively impressed between said two sets of input terminals, balanced amplifying channels for respectively impressing the voltage across the winding and the voltage of said source upon said two sets of terminals, independently adjustable means for respectively equalizing the input voltages to said amplifiers at two different frequency values of said variable frequency source, phase shifting means, and switching means for selectively connecting said independently adjustable means or said phase shifting means in circuit with the one of said amplifiers through which the voltage of said source is impressed upon one set of electrodes of said phase comparing device at the input side of said one amplifier.

6. Apparatus for determining at least one of the physical parameters of an electrical transducer provided with a pick-up or operating winding, comprising a variable frequency voltage source, circuit means including a decoupling impedance element for impressing the voltage of said source across the winding to provide for a varying phase relationship between the voltage of said source and the voltage across the winding, an oscilloscope provided with vertical and horizontal deflecting electrodes and operative to indicate the phase displacement between the voltage of said source and the voltage across the winding, amplifiers of identical characteristics and having the same gain settings for impressing the voltage across the winding and the voltage of said source across different sets of said electrodes, and adjustable means for equalizing the input voltages to said amplifiers.

7. Apparatus for determining at least one of the physical parameters of an electrical transducer provided with a pick-up or operating winding, comprising a variable frequency voltage source for exciting the winding, phase shifting means excited by the voltage of said source, means for measuring the phase relationship between the voltage across the winding and the voltage across at least a part of said phase shifting means, and circuit means including an impedance element for decoupling the winding from said source and said phase shifting means.

8. Apparatus for determining at least one of the physical parameters of an electrical transducer provided with a pick-up or operating winding, comprising a variable frequency voltage source for exciting said winding, phase shifting means excited by the voltage of said source, decoupling resistors of like resistance values for respectively connecting the winding and said phase shifting means to said source and operative to decouple the winding both from said source and from said phase shifting means, and means for measuring the phase relationship between the voltage across the winding and the voltage across at least a part of said phase shifting means.

9. Apparatus for determining at least one of the physical parameters of an electrical transducer provided with a pick-up or operating winding, comprising a variable frequency voltage source for exciting the winding, circuit means including a decoupling impedance element for decoupling the winding from said source to produce a phase relationship between the voltages thereacross which varies with variations in the frequency of said source, and means for measuring the phase relationship between the voltage across the winding and the voltage of said source.

10. Apparatus for determining one of the physical parameters of an electrical transducer provided with a pick-up or operating winding, comprising a voltage source of known frequency, means for exciting said winding from said source, a decoupling impedance for decoupling said winding from said source to permit phase displacement between the voltages thereacross, and phase measuring means for measuring the phase relationship between said voltages, the measured phase relationship between said voltages being representative of the departure of said physical parameter from a known value.

11. Apparatus for determining one of the physical parameters of an electrical transducer provided with a pick-up or operating winding, comprising a voltage source of variable frequency, means for exciting said winding from said source, a decoupling impedance for decoupling said winding from said source to permit phase displacement between the voltages thereacross, phase sensing means for sensing the phase relationship between the voltage of said source and the voltage across said winding, and means for varying the frequency of said source to establish a predetermined phase relationship between said voltages, thereby to establish a frequency value for said source which is a function of the magnitude of said one physical parameter of said translator.

12. Apparatus for determining one of the physical parameters of an electrical transducer provided with a pick-up or operating winding, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect the predetermined frequency of said source at which a predetermined phase relationship is established between said voltages, said predetermined source frequency being a function of the magnitude of said one parameter of said translator.

13. Apparatus for determining the natural resonant frequency of the vibratory system of an electrical transducer provided with a pick-up or operating winding, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect the lowest predetermined frequency of said source at which phase coincidence between said voltages is established, said lowest predetermined source frequency being a function of the natural resonant frequency of said vibratory system.

14. Apparatus for determining the natural resonant frequency of the vibratory system of an electrical transducer provided with a pick-up or operating winding, comprising a voltage source of known frequency, means for exciting said winding from said source, a decoupling impedance for decoupling said winding from said source to permit phase displacement between the voltages thereacross, and phase sensing means for sensing the phase relationship between said voltages to measure the departure of said natural resonant frequency from a known standard resonant frequency.

15. Apparatus for determining the natural resonant frequency of the vibratory system of an electrical transducer provided with a pick-up or operating winding, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect the predetermined frequency of said source at which a predetermined phase relationship is established between said voltages, said predetermined source frequency being a function of the natural resonant frequency of said vibratory system.

16. Apparatus for determining the air gap flux density of an electrical transducer provided with a pick-up or operating winding, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect the highest frequency of said source at which phase coincidence is established between said voltages, said highest source frequency being a function of the flux density in said air gap.

17. Apparatus for determining the air gap flux density of an electrical transducer provided with a pick-up or operating winding, comprising a voltage source of known frequency, means for exciting said winding from said source, a decoupling impedance for decoupling said winding from said source to permit phase displacement between the voltages thereacross, and phase sensing means for sensing phase displacement between said voltages to measure the departure of said air gap flux density from a known standard air gap flux density.

18. Apparatus for determining two different physical parameters of an electrical transducer provided with a pick-up or operating winding, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect two different predetermined source frequencies at which phase coincidence is established between said voltages, said different predetermined source frequencies being functions respectively of said two different physical parameters of said transducer.

19. Apparatus for determining the natural resonant frequency of the vibratory system of an electrical transducer provided with a pick-up or driving winding and the air gap flux density of said translator, comprising a voltage source of variable frequency, means for exciting said winding from said source, a decoupling impedance for decoupling said winding from said source to permit phase displacement between the voltages thereacross, means for varying the frequency of said source to vary the phase relationship between the voltage of said source and the voltage across said winding, and phase sensing means for sensing the phase relationship between the voltage of said source and the voltage across said winding to detect two different predetermined source frequencies at which phase coincidence is established between said voltages, the lower of said predetermined source frequencies being a function of said natural resonant frequency of said vibratory system and the upper of said predetermined source frequencies being a function of the air gap flux density of said transducer.

20. Apparatus for determining two different physical parameters of an electrical transducer provided with a pick-up or operating winding, comprising a voltage source of variable frequency, means for exciting said winding from said source, a decoupling impedance for decoupling said winding from said source to permit phase displacement between the voltages thereacross, phase sensing means for sensing the phase relationship between the voltage across said source and the voltage across said winding, and means for varying the frequency of said source to establish one source frequency at which phase coincidence is established between said voltages, said one source frequency being a function of the magnitude of one of said parameters, and for further varying the frequency of said source to establish a second source frequency at which phase coincidence is established between said voltages, said second source frequency being a function of the magnitude of the other of said parameters.

21. Apparatus for determining the air gap flux density and the natural resonant frequency of the vibratory system of an electrical transducer provided with a pick-up or operating winding, comprising a voltage source of variable frequency, means for exciting said winding from said source, a decoupling impedance for decoupling said winding from said source to permit phase displacement between the voltage across said source and the voltage across said winding, phase sensing means for sensing the phase relationship between the voltage across said source and the voltage across said winding, and means for varying the frequency of said source to establish one source frequency at which phase coincidence is sensed between said voltages, said one source frequency being a function of the natural resonant frequency of said vibratory system, and for further varying the frequency of said source to establish a second source frequency at which phase coincidence is sensed between said voltages, said second source frequency being a function of the air gap flux density of said transducer.

22. Apparatus for determining three different physical parameters of an electrical transducer provided with a pick-up or operating winding, comprising a voltage source of variable frequency, means for exciting said winding from said source, a decoupling impedance for decoupling said winding from said source to permit phase displacement between the voltage thereacross, phase sensing means for sensing the phase relationship between the voltage across said source and the voltage across said winding, and means for varying the frequency of said source to establish one source frequency at which phase coincidence is established between said voltages, said one source frequency being a function of the magnitude of one of said parameters, for further varying the frequency of said source to establish a second source frequency at which phase coincidence is established between said voltages, said second source frequency being a function of the magnitude of a second of said parameters, and for further varying the frequency of said source to a predetermined source frequency intermediate said one source frequency and said second source frequency, the magnitude of phase displacement between said voltages at said predetermined source frequency being quantitatively related to the magnitude of the third of said parameters.

23. Apparatus for determining the air gap flux density, the natural resonant frequency and the damping factor of an electrical transducer provided with a pick-up or operating winding, comprising a voltage source of variable frequency, means for exciting said winding from said source of variable frequency, a decoupling impedance for decoupling said winding from said source to permit phase displacement between the voltages thereacross, phase sensing means for sensing the phase relationship between the voltage of said source and the voltage across said winding, and means for varying the frequency of said source to establish one source frequency at which phase coincidence is established between said voltages, said one source frequency being a function of the natural resonant frequency of said vibratory system, for further varying the frequency of said source to establish a higher source frequency at which phase coincidence is established between said voltages, said higher source frequency being a function of the flux density in said air gap, and for further varying the frequency of said source to a predetermined source frequency intermediate said one and said higher source frequency, the magnitude of phase displacement between said voltages at said predetermined source frequency being a function of the magnitude of the damping factor of said transducer.

24. Apparatus for determining the damping factor of the vibratory system of an electrical transducer provided with a pick-up or operating winding, comprising a voltage source of variable frequency, means for exciting said winding from said source, a decoupling impedance for decoupling said winding from said source to permit phase displacement between the voltages thereacross, means for adjusting the frequency of said source to a value within predetermined upper and lower limits, and phase measuring means for measuring the phase displacement between said voltages, the magnitude of phase displacement between said voltages when the frequency of said source is adjusted to said value being a function of the magnitude of said damping factor.

25. Apparatus for determining the degree of damping of the vibratory system of an electrical transducer provided with a pick-up or operating winding, comprising a voltage source of known frequency, means for exciting said winding from said source, a decoupling impedance for decoupling said winding from said source to permit phase displacement between the voltages thereacross, means for displacing the phase of one of said voltages relative to the other voltage, and phase sensing means for sensing the phase relationship between said voltages after said phase displacement to determine the departure of the degree of damping of said vibratory system from a known degree of damping.

26. Apparatus for determining one of the physical parameters of an electrical transducer provided with a pick-up or operating winding, comprising a voltage source of known frequency, means for exciting said winding from said source, a decoupling impedance for decoupling said winding from said source to permit phase displacement between the voltages thereacross, means for displacing the phase of one of said voltages relative to the other voltage, and phase sensing means for sensing the phase relationship between said voltages after said phase displacement of said one voltage to determine the departure of said one parameter from a known standard.

27. Apparatus for determining a physical parameter of a fully assembled electrical transducer provided with a pick-up or operating winding, comprising an alternating voltage source, means for exciting said winding from said source, a decoupling impedance for decoupling said winding from said source, a reference signal source, means for deriving a signal from said excited winding having a phase relationship with the reference signal of said reference signal source which varies with the magnitude of said parameter, and signal comparing means for phase comparing said derived signal with the reference signal of said reference signal source to determine the phase relationship therebetween and for sensing said phase relationship to provide a quantitatively accurate indication of the magnitude of said parameter.

JESSE R. CORNETT.

References Cited in the file of this patent

UNITED STATES PATENTS

| Number | Name | Date |
|---|---|---|
| 1,652,525 | Hahnemann et al. | Dec. 13, 1927 |
| 2,008,857 | Flanders | July 23, 1935 |
| 2,233,751 | Seeley | Mar. 4, 1941 |
| 2,285,038 | Loughlin | June 2, 1942 |
| 2,416,310 | Hansen et al. | Feb. 25, 1947 |